United States Patent
Yang et al.

(10) Patent No.: US 6,452,939 B1
(45) Date of Patent: Sep. 17, 2002

(54) ATM INTERFACE DEVICE WITH DOUBLE HEADER CONVERSION

(75) Inventors: Seung-Yeop Yang, Kyonggi-do; Won-Jun Kim, Seoul, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/274,778

(22) Filed: Mar. 24, 1999

(30) Foreign Application Priority Data

Mar. 24, 1998 (KR) .............................. 98-10130
May 18, 1998 (KR) .............................. 98-17810

(51) Int. Cl.[7] .................. H04L 12/26; H04L 12/28; H04J 1/16; H04J 3/14; G06F 11/00
(52) U.S. Cl. ................ 370/465; 370/248; 370/392; 370/395
(58) Field of Search ................. 370/389, 390, 370/392, 395, 399, 419, 465, 467, 535, 248, 249, 250, 251

(56) References Cited

U.S. PATENT DOCUMENTS

| | | | |
|---|---|---|---|
| 4,891,805 A | | 1/1990 | Fallin |
| 4,947,388 A | * | 8/1990 | Kuwahara et al. .......... 370/392 |
| 5,271,010 A | * | 12/1993 | Miyake et al. .............. 370/392 |
| 5,303,233 A | * | 4/1994 | Sugawara .................. 370/399 |
| 5,394,397 A | * | 2/1995 | Yamagi et al. .............. 370/390 |
| 5,771,234 A | | 6/1998 | Wu et al. |
| 5,859,835 A | | 1/1999 | Varma et al. |
| 5,859,846 A | * | 1/1999 | Kim et al. .................. 370/389 |
| 5,862,127 A | | 1/1999 | Kwak et al. |
| 5,864,556 A | | 1/1999 | Tibi et al. |
| 5,867,480 A | | 2/1999 | Thomas et al. |
| 5,872,918 A | | 2/1999 | Malomsoky et al. |
| 5,903,573 A | * | 5/1999 | Wolf ........................ 370/535 |
| 6,031,838 A | * | 2/2000 | Okabe et al. ............... 370/395 |
| 6,122,252 A | * | 9/2000 | Aimoto et al. .............. 370/235 |
| 6,147,972 A | * | 11/2000 | Onishi et al. ............... 370/248 |

* cited by examiner

Primary Examiner—Wellington Chin
Assistant Examiner—M. Phan
(74) Attorney, Agent, or Firm—Robert E. Bushnell, Esq.

(57) ABSTRACT

An asynchronous transfer mode (ATM) interface device includes a router/header conversion unit for adding a routing tag to the header of an input cell and converting the cell header into arbitrary virtual path identifier/virtual channel identifier (VPI/VCI), and a cell switching unit for routing the cell received from the router/header conversion unit according to the routing tag. The ATM interface device also includes a second header conversion unit for converting the cell header received from the cell switching unit into the output VPI/VCI corresponding to the arbitrary VPI/VCI, and a demultiplexing unit for transferring the cell from the second header converter to the output physical link corresponding to the output VPI/VCI.

20 Claims, 5 Drawing Sheets

ATM INTERFACE DEVICE WITH DOUBLE HEADER CONVERSION

CLAIM OF PRIORITY

This application makes reference to, incorporates the same herein, and claims all benefits accruing under 35 U.S.C. § 119 from a first application entitled ATM INTERFACE DEVICE WITH DOUBLE HEADER CONVERSION earlier filed in the Korean Industrial Property Office on the 24$^{th}$ day of March 1998, and there duly assigned Serial No. 98-10130, and additionally from a second application entitled ATM INTERFACE DEVICE WITH DOUBLE HEADER CONVERSION earlier filed in the Korean Industrial Property Office on the 18$^{th}$ day of May 1998, and there duly assigned Ser. No. 98-17810, copies of which are annexed hereto.

BACKGROUND OF THE INVENTION

1. Technical Field

The present invention relates to an asynchronous transfer mode (ATM) interface device for uniformly allotting virtual path identifier/virtual channel identifier (VPI/VCI) resources, and a method therefor.

2. Related Art

In the field of high speed networking, asynchronous transfer mode (ATM) is a key component. Asynchronous transfer mode is a telecommunications technique for carriage of a complete range of user traffic, including voice, data, and video signals, on any user-to-network interface (UNI). The asynchronous transfer mode telecommunications technique was defined by the American National Standards Institute (ANSI) and International Telecommunications Union (ITU) standards.

American National Standards Institute is nonprofit organization formed in 1918 to coordinate private sector standards development in the United States of America. The International Telecommunications Union is an international standards organization that is part of the United Nations. The International Telecommunications Union, formerly known as the International Telegraph and Telephone Consultative Committee (CCITT), comprises an international committee established to promote standards for the development of telephone, telegraph systems, and data networks and to create the environment for interworking between the networks of the different countries of the world.

ATM is extremely well suited to high speed networking. Asynchronous transfer mode technology can be used to aggregate user traffic from existing applications onto a single user-to-network interface, and to facilitate multimedia networking between high speed devices at high speeds, for example 150 megabits per second.

Packet-switching technologies are used to relay data traffic via an address contained within a packet. Asynchronous transfer mode (ATM) is one of a class of such packet-switching technologies. ATM is a transfer mode in which the information is organized into cells. It is asynchronous in the sense that the recurrence of cells containing information from an individual user is not necessarily periodic.

There are different types of asynchronous transfer mode switches. The term "switch fabric" refers to the method of data being switched from one node to another within a network. The term "cell" refers to a fixed-length unit of data traveling through the switch fabric. Cell switching breaks up data streams into small units that are independently routed through the switch. The routing occurs mostly in hardware through the switching fabric. The combination of cell switching and scaleable switching fabrics are key components of asynchronous transfer mode.

A virtual channel (VC) is a communication channel that provides for the sequential unidirectional transport of ATM cells. A virtual path (VP) is a unidirectional logical association or bundle of virtual channels. A virtual channel identifier (VCI) is an identifier of a virtual channel that can be used to identify a virtual channel. A virtual path identifier (VPI) is an identifier of a virtual path that can be used to identify a virtual path.

I have found that an inconsistent allotment of the VPI/VCI resources in an ATM interface device can be disadvantageous. Efforts have been made to improve networking technology including ATM telecommunications techniques.

Exemplars of recent efforts in the art include U.S. Pat. No. 5,872,918 for SYSTEM AND METHOD FOR OPTIMAL VIRTUAL PATH CAPACITY DIMENSIONING WITH BROADBAND TRAFFIC issued to Malomsoky et al., U.S. Pat. No. 5,867,480 for METHOD AND APPARATUS FOR CONTROLLING CONGESTIONINA NETWORKNODE issued to Thomas et al., U.S. Pat. No. 5,864,556 for MULTIPLEXER FOR AN ATM NETWORK WHICH EMPLOYS A HIERARCHICAL CELL ALLOCATION SCHEME issued to Tibi et al., U.S. Pat. No. 5,862,127 for METHOD OF CONTROLLING THE PEAK CELL RATE SPACING OF MULTIPLEXED ATM TRAFFIC issued to Kwak et al., U.S. Pat. No. 5,859,835 for TRAFFIC SCHEDULING SYSTEM AND METHOD FOR PACKET-SWITCHED NETWORKS issued to Varma et al., U.S. Pat. No. 5,771,234 for METHOD AND SYSTEM FOR ATM CELL MULTIPLEXING UNDER CONSTANT BIT RATE, VARIABLE BIT RATE AND BEST-EFFORT TRAFFIC issued to Wu et al. , and U.S. Pat. No. 4,891,805 for MULTIPLEXER WITH DYNAMIC BANDWIDTH ALLOCATION issued to Fallin.

While these recent efforts provide advantages, I note that they fail to adequately provide an ATM apparatus and method for efficiently and uniformly allotting VPI/VCI resources.

SUMMARY OF THE INVENTION

It is an object of the present invention to provide an ATM interface device for uniformly allotting the VCI/VPI resources by adding an output physical link tag to the overheader of the input cell.

It is a further object of the present invention to provide a method for uniformly allotting the VCI/VPI resources by adding an output physical link tag to the overheader of the input cell.

According to the present invention, an ATM interface device comprises a router/header conversion unit for adding a routing tag to the header of an input cell and converting the cell header into arbitrary virtual path identifier/virtual channel identifier (VPI/VCI), a cell switching unit for routing the cell received from the router/header conversion unit according to the routing tag, a second header conversion unit for converting the cell header received from the cell switching unit into the output VPI/VCI corresponding to the arbitrary VPI/VCI, and a demultiplexing unit for transferring the cell from the second header converter to the output physical link corresponding to the output VPI/VCI.

According to another aspect of the present invention, an ATM interface device comprises a router/header conversion unit for adding a routing tag and an output physical link tag to the header of an input cell and converting the content of the cell header into the output VPI/VCI, a cell switching unit for routing the cell received from the router/header conversion unit according to the routing tag, and a demultiplexing unit for transferring the cell from the cell switching unit to the output physical link represented by the output physical link tag.

To achieve these and other objects in accordance with the principles of the present invention, as embodied and broadly described, the present invention provides an asynchronous transfer mode apparatus, comprising: a first converting unit receiving a data cell, adding a routing tag to a header of said cell, and converting said header into a first identifier; a switching unit receiving said cell from said routing unit and routing said cell along a plurality of paths according to said routing tag; a second converting unit receiving said cell from said switching unit, converting said header into a second identifier according to said first identifier; and a demultiplexing unit receiving said cell from said second converting unit and transferring said cell to an output physical link corresponding to said second identifier.

To achieve these and other objects in accordance with the principles of the present invention, as embodied and broadly described, the present invention provides a method, comprising: receiving a cell containing data and a header; adding a routing tag to said header of said cell and converting information in said header into a first virtual path identifier and a first virtual channel identifier; internally routing said cell along a plurality of paths according to said routing tag; transforming said internally routed cell header into a second virtual path identifier and a second virtual channel identifier corresponding to said first virtual path and channel identifiers; and transferring said cell to an output physical link corresponding to said second virtual path and channel identifiers.

To achieve these and other objects in accordance with the principles of the present invention, as embodied and broadly described, the present invention provides an apparatus, comprising: a router/header conversion unit receiving a data cell having a header including first header information, adding a routing tag and an output physical link tag to said header of said received data cell, and converting said header into an output identifier corresponding to said output physical link tag; a cell switching unit routing said cell received from said router/header conversion unit along a plurality of paths according to said routing tag; and a demultiplexing unit transferring said cell from said cell switching unit to an output physical link corresponding to represented by said output physical link tag.

To achieve these and other objects in accordance with the principles of the present invention, as embodied and broadly described, the present invention provides a method for allotting virtual path identifier/virtual channel identifier resources in an asynchronous transfer mode interface device, comprising the steps of: receiving a data cell having a header; adding a routing tag and an output physical link tag to said header, and converting information in said header into an output virtual path identifier and an output virtual channel identifier corresponding to said output physical link tag; rounting said cell according to said routing tag; and transferring said cell to an output physical link corresponding to said output physical link tag.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being abroad, teaching disclosure directed to persons of skill in the appropriate arts, and not as limiting upon the present invention.

Generally, the asynchronous transfer mode (ATM) protocol structure is defined by extending the narrowband-integrated services digital network (N-ISDN) protocol structure according to the open systems interconnection (OSI) layer model. The OSI layer model is a communication model from the International Standards Organization (ISO). Each layer provides inherent functional services with the help of the next lower layer's services. The ATM protocol structure fundamentally consists of physical layer, an ATM layer, an ATM adaptation layer (AAL), and a higher layer. The physical layer further includes a physical medium sublayer (PM) and a transmission convergence sublayer (TC), providing the transmission resources for carrying ATM cells. The ATM layer provides the ATM communication regardless of transmission system, performing multiple partitioning of cells, selection of a virtual channel and path and generation and deletion of cell headers. The ATM adaption layer divides information into uniform lengths adapted to construct cells between the ATM layer and the higher layer.

In such an ATM interface device, the multiplexing unit of the physical layer generally multiplexes the input cells transferred to the ATM layer. Then, the router/header conversion unit writes the information concerning the output ports of the internal switching unit into the cell headers, and converts the contents of the headers into those of the output physical links transferred to the cell switching unit. In this case, the information written into the cell headers is called 'routing tag'. The cell switching unit switches the received cells to the demultiplexing unit according to the routing tag. Finally, the demultiplexing unit outputs the input cells through the physical links corresponding to the header contents (VPI/VCI). Thus, such an ATM interface device makes the physical layer select the output physical links according to the cell outputs VPI/VCI for outputting the ATM cells. Hence, if a certain physical link is allotted with the output VPI/VCI, the other physical links of the corresponding demultiplexer may not be used with the VPI/VCI. This causes inconsistent allotment. of the VPI/VCI resources in an ATM interface device with multiple physical links. I have found that such an inconsistent allotment of the VPI/VCI resources in an ATM interface device can be disadvantageous.

Figure 1:
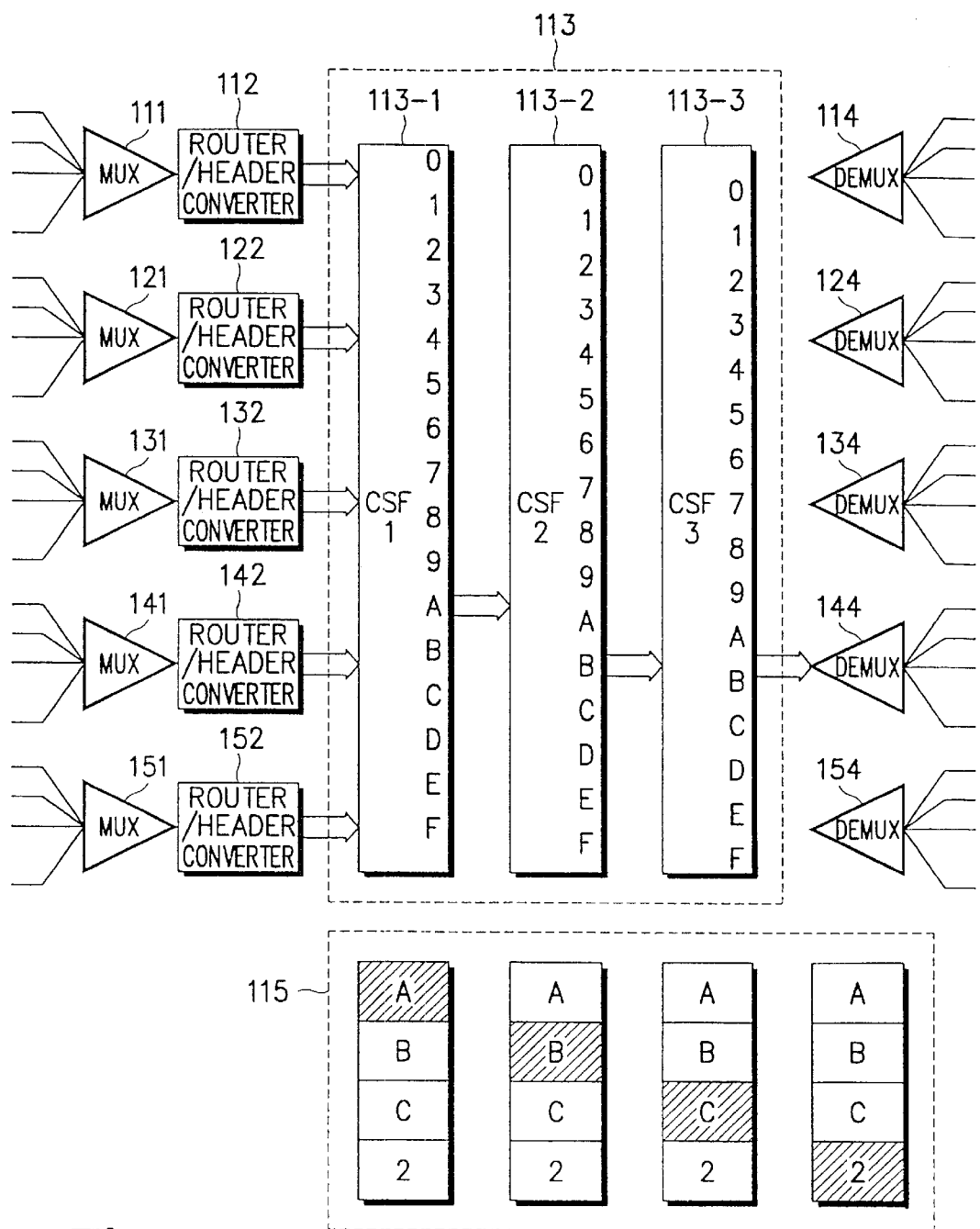
FIG. 1 is a block diagram illustrating a first embodiment of ATM interface device, in accordance with the principles of the present invention.

Refer now to FIG. 1, which is a block diagram illustrating a first embodiment of an ATM interface device, in accordance with the principles of the present invention. Referring to FIG. 1, a multiplexing unit (MUX) 111, 121, 131, 141, and 151 multiplexes the cells received from multiple physical links. A router/header conversion unit 112, 122, 132, 142, and 152 adds the routing tags to the cells, and performs the header conversion. In particular, the router section adds the information of the output ports of the internal switching unit/cell switch fabric (CSF) and the output physical link tags to the cell headers outputted from the multiplexing unit. The header conversion section converts the contents of the cell headers received from the router section into the output VPI/VCI according to a look-up table. The cell switching unit 113 routes the cells received from if the router/header conversion unit 112, 122, 132, 142, and 152 according to the routing tags added to the headers.

In the first embodiment shown in FIG. 1, the routing path is as shown by reference numeral 115. Namely, the cell is routed through port 'A' of the first stage 113-1 to port 'B' of the second stage 113-2 to port 'C' of the third stage 113-3. The demultiplexing unit 114, 124, 134, 144, and 154 transmits the routed cell to the physical link represented by the output physical link tag of its header. Here, the information of the output physical link tag represents the second link. Thus, the cell from the cell switching unit 113 is transferred to the second link of the demultiplexer 144 of the demultiplexing unit 114, 124, 134, 144, and 154.

Describing the process of transferring the ATM cell inputted through a certain physical link, it is multiplexed and transferred to a router, which adds the information of the output port of the cell switch unit 113 and the output physical link tag to the header of the cell. In addition, the header converter converts the contents of the header of the ATM cell into the output VPI/VCI. The converted cell is routed by the cell switching unit 113 to the demultiplexing unit 114, 124, 134, 144, and 154 according to the routing tag. The demultiplexing unit 114, 124, 134, 144, and 154 transfers the cell to the physical link represented by the output physical link tag added to the header.

Figure 2:
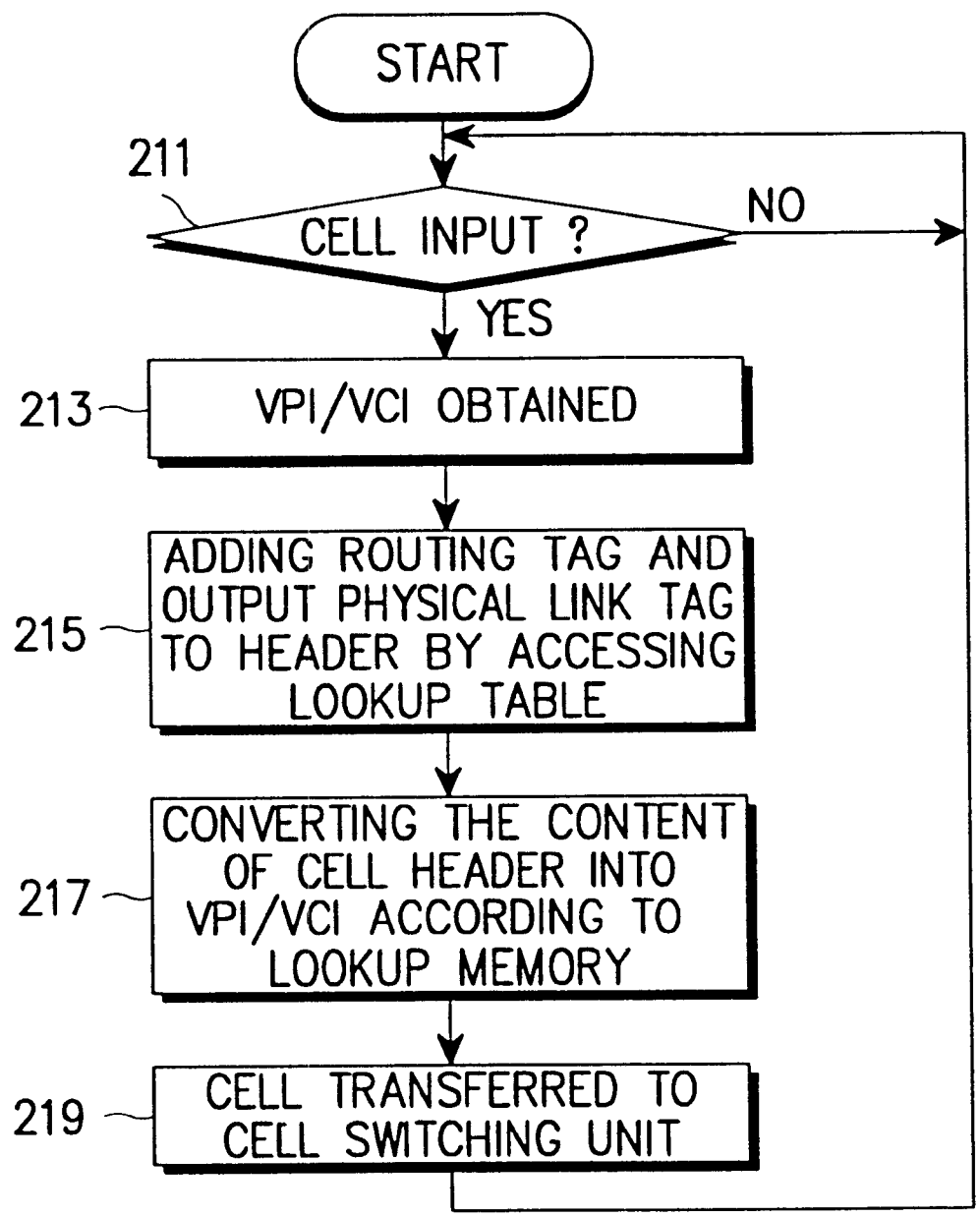
FIG. 2 is a flowchart illustrating the process of adding the output physical link tag to the input cell in the ATM interface device as shown in FIG. 1, in accordance with the principles of the present invention.

Refer now to FIG. 2, which is a flowchart illustrating the process of adding the output physical link tag to the input cell in the ATM interface device as shown in FIG. 1, in accordance with the principles of the present invention. Hereinafter is described the process of adding the output physical link tag to the input cell with reference to FIGS. 1 and 2. At step 211, the router/header converter 112 detects the input of a cell from an input physical link. Step 213 is performed when a cell is detected, otherwise step 211 is repeated. In other words, the process goes to step 213 upon detecting a cell, or otherwise returns to step 211. At step 213, the router/header converter 112 accesses the lookup memory for the input VPI/VCI from the cell header. At step 215, after obtaining the routing and output physical link tags from the lookup memory, the router/header converter 112 adds them to the cell header. At step 217, the router/header converter 112 transforms or converts the cell header into the output VPI/VCI obtained from the lookup memory. At step 219, the router/header converter 112 transfers the cell to the cell switching unit 113. Thereafter, the cell is switched by the cell switching unit according to the routing tag, transferred through the demultiplexing unit to the physical link represented by the output physical link tag. And then the process returns to step 211 to detect the input of a new cell. An example of the lookup table is shown in Table 1.

TABLE 1

| VPI input | VCI input | Routing Tag | | | Output Physical Link | VPI output | VCI output |
|---|---|---|---|---|---|---|---|
| 0 | 31 | A | B | C | 2 | 0 | 20 |
| 0 | 32 | B | C | F | 3 | 0 | 21 |
| 0 | 33 | 1 | 2 | 3 | 1 | 0 | 22 |
| — | — | — | — | — | — | — | — |

For example, if the VPI/VCI of the cell inputted from a physical link is 0/31, the router accesses the lookup table as shown in Table 1 to obtain the routing tag "A, B, C" and the output physical tag "2" according to the information 0/31. The tags are added to the overheader of the cell. Meanwhile, the header converter updates the cell header with the output VPI/VCI "0/20" transferred to the cell switching unit 113. In this case, the cell structure transferred to the cell switching unit 113 is as shown in Table 2.

TABLE 2

| A | B | C | 2 |
|---|---|---|---|
| | | Header | |
| | | Payload 48 bytes | |

Figure 3:
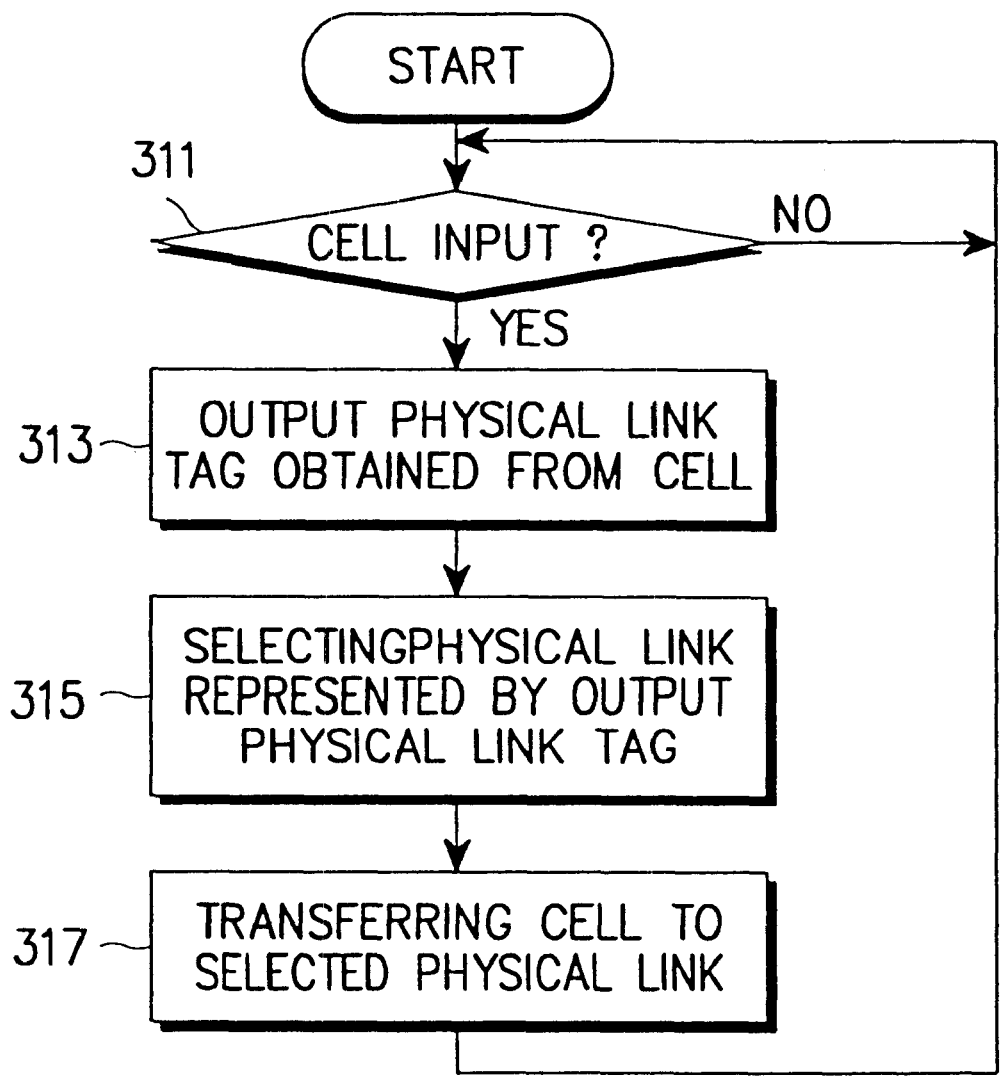
FIG. 3 is a flowchart illustrating the process of outputting the cell to the physical link according to the output physical link tag in the ATM interface device as shown in FIG. 1, in accordance with the principles of the present invention.

Refer to FIG. 3, which is a flowchart illustrating the process of outputting the cell to the physical link according to the output physical link tag in the ATM interface device as shown in FIG. 1, in accordance with the principles of the present invention. The process of transferring the cell to the physical link represented by the output physical link tag shall be described with reference to FIG. 3. At step 311, the demultiplexing unit 114, 124, 134, 144, and 154 detects the input of a cell from the cell switching unit 113. At step 313, when the cell is detected the output physical link tag of the cell is obtained. Step 311 is repeated when the cell is not detected. In other words, the process returns to step 311 to detect the input of a new cell when no cell is detected in step 311. At step 315, the demultiplexing unit 114, 124, 134, 144, and 154 selects the physical link represented by the output physical link tag. At step 317, finally, it transfers the received cell to the selected physical link. Then the process returns to step 311 to detect the input of a new cell. Thus, the overhead of the cell is added with the output physical link tag to uniformly allot the VCI/VPI resources to the output physical links. In addition, the output module requires no lookup table to select the output physical link.

Figure 4:
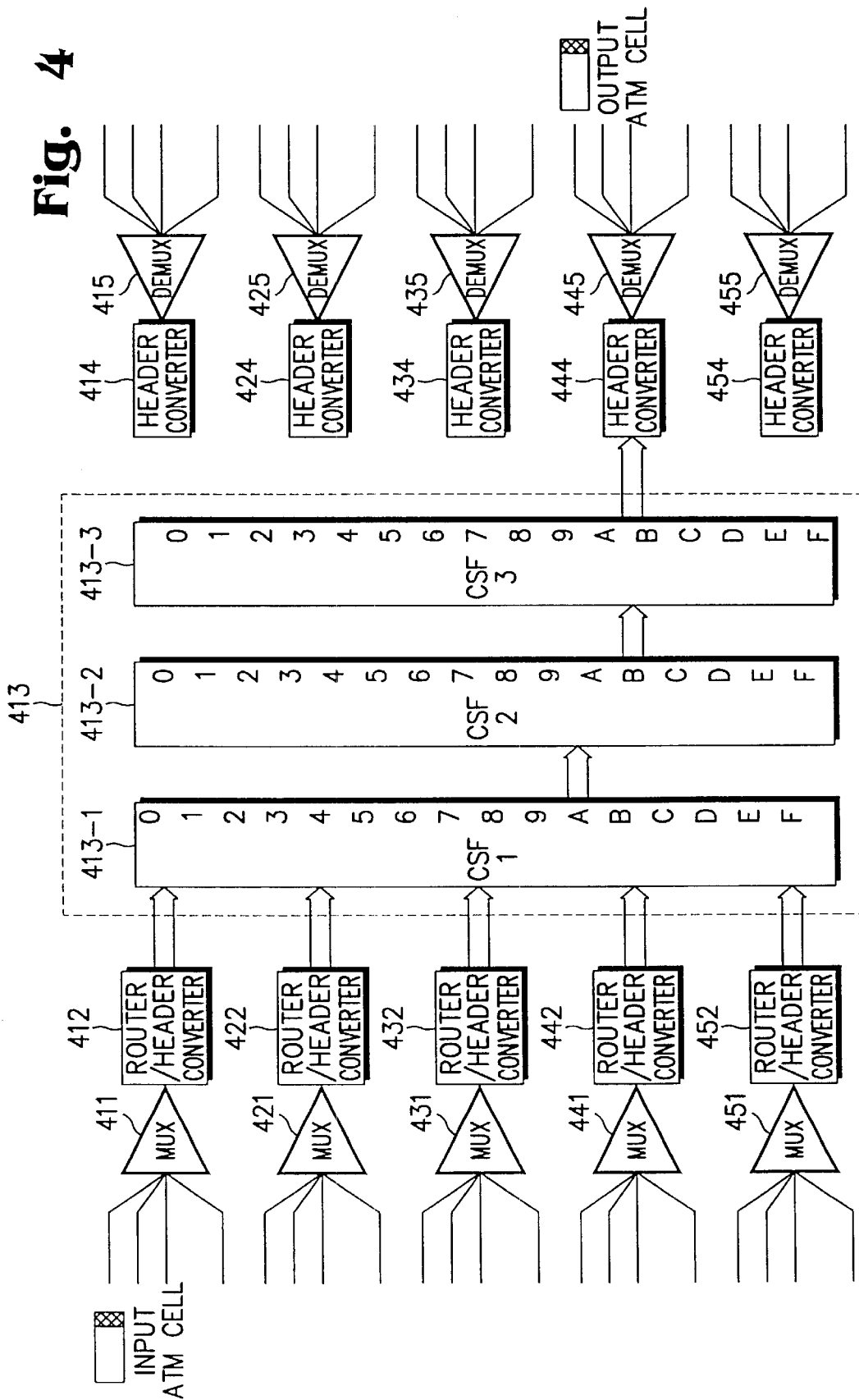
FIG. 4 is a block diagram illustrating a second embodiment of an ATM interface device, in accordance with the principles of the present invention.

Refer now to FIG. 4, which is a block diagram illustrating a second embodiment of an ATM interface device, in accordance with the principles of the present invention. Hereinafter described with reference to FIG. 4 is an ATM interface device to perform double header conversion according to another embodiment of the present invention. A multiplexing unit 411, 421, 431, 441, and 451 multiplexes the cells received from multiple physical links. A router/header conversion unit 412, 422, 432, 442, and 452 adds the routing tags to the cells, and performs the header conversion. In particular, the router section adds the information of the output ports of the internal switching unit/cell switch fabric (CSF) to the cell headers outputted from the multiplexing unit. The header conversion section converts the contents of the cell headers received from the router section into arbitrary output VPI/VCI. The cell switching unit 413 consisting of three stages routes the cells according to the routing tags added to the headers. In the present embodiment of FIG. 4, if the routing tag is "A, B, C", the cell is routed through port 'A' of the first stage 413-1 to port 'B' of the second stage 413-2 to port 'C' of the third stage 413-3. The second header conversion unit 414,424, 434, 444 and 454 selects the output physical link corresponding to the arbitrary VPI/VCI of the cell header from the cell switching unit 413, converting the cell header into the output VPI/VCI corresponding to the physical link. In this case, the second header conversion unit 414, 424, 434, 444, and 454 is provided with a lookup memory for storing the output physical link tags corresponding to the arbitrary VPI/VCI and the output VPI/VCI to perform the header conversion. The demultiplexing unit 415, 425, 435, 445, and 455 transmits the cells from the second header conversion unit 414, 424, 434, 444, and 454 to the respective physical links.

In operation, the cells received through the physical links are multiplexed transferred to the router/header conversion unit 412, 422, 432, 442, and 452, where the router section adds the information concerning the output ports of the 3-stage cell switching unit to the cell headers, and the header conversion section converts the cell headers into arbitrary VPI/VCI transferred to the cell switching unit 413. This is accomplished through a lookup table provided in the router/header conversion unit as shown in Table 3.

TABLE 3

| VPI input | VCI input | Routing Tag | | | Arbitrary VPI | Arbitrary VCI |
| --- | --- | --- | --- | --- | --- | --- |
| 0 | 31 | A | B | C | 0 | 95 |
| 0 | 32 | B | C | F | 0 | 96 |
| 0 | 33 | 1 | 2 | 3 | 0 | 97 |
| — | — | — | — | — | — | — |

For example, if the VPI/VCI of the cell inputted to the router/header conversion unit 412, 422, 432, 442, and 452 is 0/31, the router accesses the lookup table as shown in Table 3 to obtain the routing tag "A, B, C" and the arbitrary VPI/VCI "0/95" according to the information 0/31. The routing/header conversion unit 412, 422, 432, 442, and 452 adds the routing tag "A, B, C" to the header of the input cell, and converts the contents of the cell header into the arbitrary VPI/VCI ("0/95") transferred to the cell switching unit 413, which in turn routes the cell to the second header conversion unit 414, 424, 434, 444, and 454 according to the routing tag "A, B, C". Namely, the cell is routed through port 'A' of the first stage 413-1 to port 'B' of the second stage 413-2 to port 'C' of the third stage 413-3 transferred to the second header converter 444, which in turn accesses the lookup table according to the arbitrary VPI/VCI of the cell header to convert the cell header into the VPI/VCI corresponding to the output physical link transferring it to the demultiplexer 445. The lookup table provided in the second header converter 444 is as shown in Table 4.

TABLE 4

| Arbitrary VPI | Arbitrary VCI | Physical Link | VPI output | VCI output |
| --- | --- | --- | --- | --- |
| 0 | 95 | 13 | 0 | 20 |
| 0 | 96 | 14 | 0 | 21 |
| 0 | 97 | 15 | 0 | 22 |
| — | — | — | — | — |

Namely, the second header converter 444 accesses the lookup table as in Table 4 to obtain the output physical link No. 13, according to which the content of the cell header is converted into VPI/VCI ("0/20"). Then, the demultiplexer 445 transfers the cell from the second header converter 444 to the output physical link No. 13.

Figure 5:
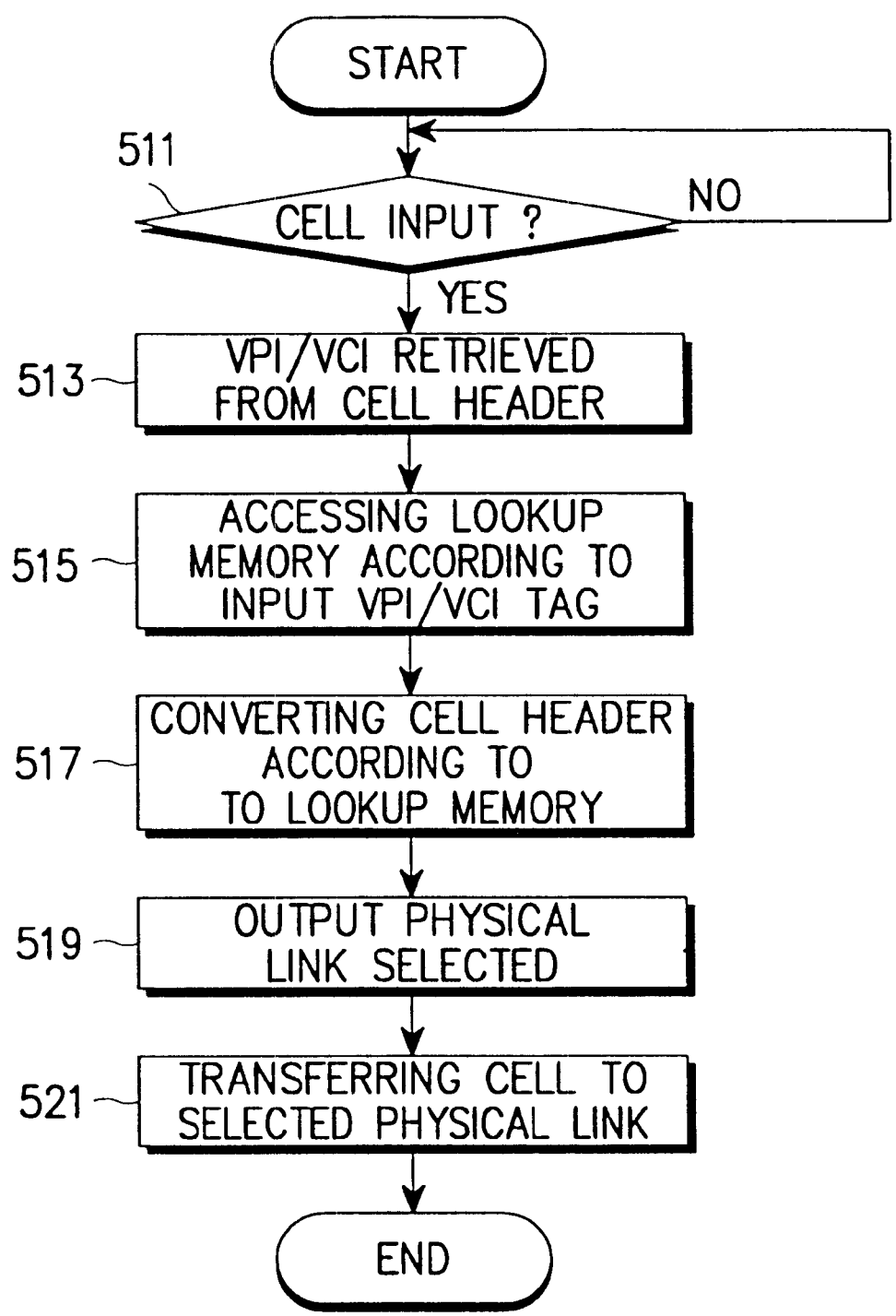
FIG. 5 is a flowchart illustrating the process of double header conversion in the ATM interface device as shown in FIG. 4, in accordance with the principles of the present invention.

Refer now to FIG. 5, which is a flowchart illustrating the process of double header conversion in the ATM interface device as shown in FIG. 4, in accordance with the principles of the present invention. Hereinafter is described the process of performing the double header conversion of the cell received from the cell switching unit with reference to FIG. 5. At step 511, the second header conversion unit 414, 424, 434, 444, and 454 detects the input of a cell from the cell switching unit 413. At step 513, when a cell is detected, the VPI/VCI is retrieved from the cell header. Otherwise, when a cell is not detected, step 511 is repeated in a standby mode. At step 515, the lookup memory is accessed according to the retrieved VPI/VCI. The lookup memory stores the output physical link tags and output VPI/VCI tags corresponding to the input VPI/VCI. At step 517, the cell header is converted into the output VPI/VCI obtained by accessing the lookup memory. At step 519, the output physical link is selected from the lookup memory. At step 521, the cell is transferred to the selected physical link.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention by in its broader aspects is not limited to the specific details, representative apparatus and method, and illustrative examples shown and described. Accordingly, departures may be made from such details without departing from the spirit or scope of the applicant's general inventive concept.

What is claimed is:

1. An asynchronous transfer mode apparatus, comprising:

a first converting unit receiving a data cell with a header having an input virtual identifier, retrieving said input virtual identifier from said header, reading a routing tag and a first identifier from a first memory in response to said retrieved input virtual identifier, adding said routing tag to an overheader of said cell, and converting contents of said header into said first identifier, said header and overheader being distinguishable from each other, said routing tag and first identifier each being associated with said input virtual identifier in said first memory;

a switching unit receiving said cell from said first converting unit and routing said cell along a path according to said routing tag in said overheader;

a second converting unit receiving said cell from said switching unit, retrieving said first identifier from said header, reading a physical link and a second identifier from a second memory in accordance with said retrieved first identifier, converting data in said header into said second identifier, said second identifier and physical link being associated with said first identifier in said second memory; and a demultiplexing unit receiving said cell from said second converting unit and transferring said cell to said physical link corresponding to said second identifier.

2. The apparatus of claim 1, said first identifier including a first virtual path identifier and a first virtual channel identifier, and said second identifier including a second virtual path identifier and a second virtual channel identifier.

3. The apparatus of claim 1, said apparatus corresponding to an asynchronous transfer mode interface device allotting virtual path identifier/virtual channel identifier resources.

4. The apparatus of claim 3, said first identifier including a first virtual path identifier and a first virtual channel identifier, and said second identifier including a second virtual path identifier and a second virtual channel identifier.

5. The apparatus of claim 1, said first converting unit comprising said first memory.

6. The apparatus of claim 5, said first converting unit comprising said second memory.

7. The apparatus of claim 6, said input virtual identifier including an input virtual path identifier and an input virtual channel identifier.

8. The apparatus of claim 1, said first identifier including an arbitrary virtual path identifier and an arbitrary virtual channel identifier.

9. A method, comprising:

receiving a cell containing data and a header having an input virtual identifier;

retrieving said input virtual identifier from said header;

reading a routing tag and a first virtual path identifier and a first virtual channel identifier from a first memory in accordance with said retrieved input virtual identifier, said routing tag and first virtual path and channel identifiers each being associated with said input virtual identifier in said first memory;

adding said routing tag to an overheader of said cell and converting information in said header into said first virtual path identifier and first virtual channel identifier, said header and overheader being distinguishable from each other;

internally routing said cell along a plurality of paths according to said routing tag in said overheader;

retrieving said first virtual path and channel identifiers from said header;

reading a physical link and a second virtual path identifier and a second virtual channel identifier from a second memory in accordance with said retrieved first virtual path and channel identifiers, said physical link and second virtual path and channel identifiers each being associated with said first virtual path and channel identifiers in said second memory;

transforming contents of said internally routed cell header into said second virtual path identifier and said second virtual channel identifier corresponding to said first virtual path and channel identifiers; and transferring said cell to said physical link.

10. The method of claim 9, said method corresponding to a process of allotting virtual path identifier/virtual channel identifier resources in an asynchronous transfer mode interface device.

11. The method of claim 9, said first and second memories being separately located.

12. An apparatus, comprising:

a router/header conversion unit receiving a data cell having a header including first header information, retrieving said first header information from said header, reading a routing tag and an output physical link tag and an output identifier from a memory in accordance with said retrieved first header information, adding said routing tag and said output physical link tag to an overheader of said received data cell, and converting said header into said output identifier, said header and overheader being distinguishable from each other, said retrieved first header information and said routing tag and output physical link tag and output identifier being stored in said memory, said routing tag and output physical link tag and output identifier being associated with said first header information in said memory;

a cell switching unit routing said cell received from said router/header conversion unit along a plurality of paths according to said routing tag in said overheader; and a demultiplexing unit transferring said cell from said cell switching unit to an output physical link corresponding to said output physical link tag in said overheader.

13. The apparatus of claim 12, said first header information in said header including an input virtual path identifier and an input virtual channel identifier.

14. The apparatus of claim 13, said output identifier corresponding to an output virtual path identifier and an output virtual channel identifier.

15. The apparatus of claim 14, said router/header conversion unit comprising said memory.

16. A method for allotting virtual path identifier/virtual channel identifier resources in an asynchronous transfer mode interface device, comprising the steps of:

receiving a data cell having a header with header information;

retrieving said header information from said header;

reading a routing tag and an output physical link tag and an output virtual path identifier and an output virtual channel identifier from a memory in accordance with said retrieved header information, said routing tag and output physical link tag and output virtual path and channel identifiers each being associated with said retrieved header information in said memory;

adding said routing tag and said output physical link tag to an overheader of said data cell;

converting said header information in said header into said output virtual path identifier and said output virtual channel identifier, said header and overheader being distinguishable from each other;

routing said cell according to said routing tag in said overheader; and transferring said cell to an output physical link corresponding to said output physical link tag in said overheader.

17. The method of claim 16, said retrieved header information including a first virtual path identifier and a first virtual channel identifier.

18. The method of claim 17, said routing of said cell being along a plurality of internal paths within said asynchronous transfer mode interface device.

19. The method of claim 17, said routing of said cell being along a plurality of paths coupled to said asynchronous transfer mode interface device.

20. The method of claim 18, said routing of said cell along said plurality of internal paths according to said routing tag being performed by a cell switching unit having a plurality of interconnected switching stages.

* * * * *